Oct. 23, 1962   L. CAGNIARD   3,060,372
ELECTRICAL PROSPECTION
Filed March 27, 1958

Inventor:
Louis Cagniard
By his attorneys:
Baldwin & Wight

United States Patent Office 3,060,372
Patented Oct. 23, 1962

3,060,372
ELECTRICAL PROSPECTION
Louis Cagniard, Paris, France, assignor to Centre National de la Recherche Scientifique, Paris, France, a corporation of France
Filed Mar. 27, 1958, Ser. No. 724,329
Claims priority, application France Apr. 2, 1957
12 Claims. (Cl. 324—1)

The present invention relates to the electrical prospection of regions having a high resistivity, and in particular of deeply frozen ground or ground permanently covered with ice (polar regions, regions of high mountains, etc.).

At the present time, a large number of methods of electrical prospection are known, mainly used in the search for deposits of ores, fuels and sheets of water, or to study the structure of the ground before eventually carrying out certain civil engineering works (barrages, tunnels, etc.). These known methods determine and study the distribution in the ground of existing electric currents (natural currents known as telluric currents or stray currents of industrial origin) or currents artificially generated by the prospector (continuous, pulsating or alternating currents of various frequencies, or more generally variable currents of any particular form), this distribution depending essentially on the constitution, the nature and the structure of the underground, the various portions of which offer unequal resistances to the passage of electric currents.

Among the various known methods, the most numerous make use of measuring electrodes (and also of injection in the case of the use of artificially generated currents by the prospector) buried in the ground; such methods, which are perfectly suitable for electric prospection of the usual kinds of ground having a resistivity which does not exceed a few thousand ohms per metre, cannot however be applied to the prospection of ground which is deeply frozen and/or covered with a layer of ice, in view of the fact that the resistivity of ice is of the order of several multiples of ten megohms per metre. Now, the regions of the earth which are permanently covered with ice and/or those in which the ground is permanently frozen are of constantly-increasing interest, both from the point of view of structure research for the siting of civil engineering works (the construction of aerodromes or railways for example) and from the point of view of searches for deposits of raw materials.

It might be thought that the electrical prospection of such ground could be effected by employing, amongst the known methods of electrical prospection, the purely inductive methods, that is to say those which employ alternating currents of relatively high frequency, excited in the ground by electro-magnetic induction without the aid of injection electrodes, the measurement being also effected without the use of electrodes buried in the ground. These inductive methods have however a certain number of drawbacks, since they necessarily involve bulky and expensive equipment for the creation and measurement of these currents induced in the ground. In addition, they do not enable all types of measurement to be effected, in particular the measurement of telluric or stray currents.

It has been found however, with surprise, that it is possible to carry out the electrical prospection of regions of very high resistance by using both the pre-existing currents in the ground (telluric currents and stray currents) and currents voluntarily injected into the ground, when use is made of an electrometer or an electrometer tube, as defined below, to detect the currents employed (which are of very small intensity by reason of the very high resistivity of the regions), and when the insulation or suitable electrostatic screening of the various portions of the electrical prospection device is effected. It has thus been possible to solve a problem to which a practical solution had not previously been found.

The present invention has thus for its object a device for the electrical prospection of ground of very high resistivity, and in particular of frozen ground and/or ground covered with ice, the device being of small bulk and low production cost and capable of universal application, that is to say enabling all the measurements and determinations generally made during the electrical prospection of the usual kinds of ground of normal resistivity (map of potentials, determination of resistivities, electrical soundings, telluric measurements, magneto-telluric measurements, etc.) since it is possible both to study the currents pre-existing in the ground (telluric currents and stray currents) and currents injected into the ground by the prospector.

A measuring device in accordance with the invention for electrical prospection comprises: a first electrode buried in the ground; a second electrode also buried in the ground; a working floor placed on the ground and electrically connected to the second electrode; an electrical apparatus placed on the said floor and comprising an electrometer receiver (with a sensitive member, a casing and an output) electrically insulated from the said floor, an indicating apparatus having its input coupled to the output of the said receiver and preferably a potentiometer having one of its terminals connected to the second electrode and the other terminal to the casing of the said receiver; and a coaxial cable having its axial conductor connected between the first electrode and the sensitive member of the receiver, the portion of the conducting braid of the cable in the vicinity of the receiver being connected to the casing of the receiver.

In the preferred form of embodiment, the first electrode is constituted by a strip of metallic wire-netting or lattice of large mesh, the combination of the second electrode and the working floor is constituted by a strip of large-mesh wire-netting folded in the form of a U, the receiver is composed of an electronic tube, known as an electrometer tube, the sensitive member of which is the control grid, the output of the electrometer tube being coupled through regulating rheostats to a galvanometer having the function of an indicator, and means may be provided for effecting the mechanical or photographic recording of the indications of the galvanometer.

By the term "electrometer tube" in the present specification, is meant an electronic tube of special construction and having an extremely high input impedance, of the order of several hundred megohms, and serving as the first stage of an amplifier for electrostatic measurements.

In the case of measurements made on currents generated artificially in the ground by the prospector, the device in accordance with the invention is completed by a current-injection apparatus, preferably comprising two large-mesh metallic wire-netting electrodes connected together by an insulating conducting cable, a source of voltage of low power being provided in series with the cable. This apparatus preferably comprises in addition a switch (or a reversing switch) and a device for measuring the current delivered, constituted for example by a resistance arranged in series with the source of voltage and the switch (or reversing switch), and an electrometer (or an electrometer-tube) arranged in parallel with the resistance.

There will now be described by way of example and without any implied limitation, a particular form of embodiment of an electrical prospection device in accordance with the invention, which may be eventually completed by an apparatus for injecting current into the ground. Reference will be made to the accompanying diagrammatic drawings, in which.

Figure 1:
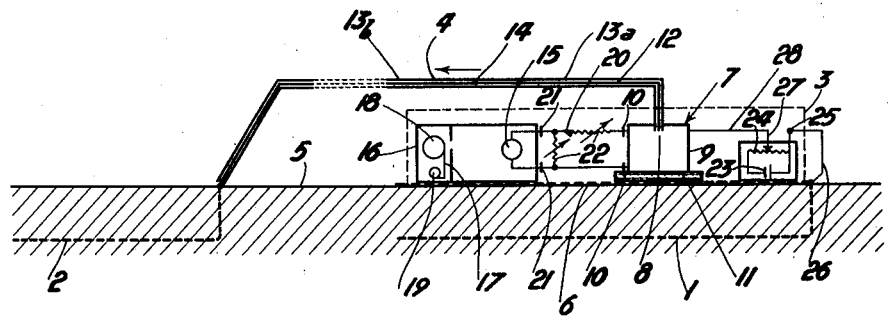
FIG. 1 is a view in cross-section through a vertical plane of a device in accordance with the invention in the working position.

In one form of embodiment which has been used for tests carried out on the Aletsch Glacier in Switzerland, a measuring and recording device enabling electrical prospection to be carried out on ice or frozen ground (see FIGS. 1 and 2), comprises essentially two measuring electrodes 1 and 2, an assembly 3 of electrical apparatus and a coaxial cable 4.

Each measuring electrode, made of wire-netting or lattice of large mesh, for example of the kind used for enclosing chicken-runs and having a surface area of several square metres, is buried to a small depth under the surface 5 of the ice or frozen ground.

The electrode 1 is electrically connected to a conducting floor 6, on which the operator (not shown) is located, and on which is placed the assembly 3 of electrical apparatus. In the form of embodiment shown, the floor 6 and the electrode 1 are produced by folding a rectangular plate of metal wire-netting of the type referred to above, in the form of a U.

The apparatus 3 comprises first of all an electrometer tube 7 comprising a control grid 8, an outer metallic casing 9 and two output terminals 10. The electrometer tube rests on an insulating base 11, and its control grid 8 is coupled through the axial conductor 12 of the coaxial cable 4 to the electrode 2, the metal braid 13a—13b of this cable serving as an electrostatic screen for this axial conductor. Over a length of several metres from the tube 7 (portion 13a), the metal braid is electrically coupled to the casing 9 so as to be brought to the same potential as this casing. A gap is provided in the braid at 14, the remaining portion 13b of the braid being insulated both from the electrode 2 and from the casing 9 of the electrometer tube 7. In FIG. 1, the inner layers of insulation (between the axial conductor wire 12 and the braid 13a—13b) and the outer layers (round the braiding 13a—13b) have not been shown in order to simplify the drawing.

The output current of the electrometer 7 is preferably amplified in an amplifier (not shown), which is incorporated in the electrometer inside the casing 9, before being passed to a sensitive galvanometer 15, the spot of which can be observed on a graduated scale or recorded photographically on a band of light-sensitive paper unwinding at a constant speed.

In the form of embodiment shown, a photographic recorder 16 is used, comprising a band of light-sensitive paper 17 unrolling from a drum 18 and being wound on a drum 19. In FIG. 1, it can also be seen that, in the electric circuit 20 which connects the output terminals 10 of the electrometer 7 to the input terminals 21 of the galvanometer 15, there are preferably arranged two rheostats 22 by means of which the sensitivity of measurement can be regulated.

In view of the fact that, with a device according to the invention a small constant difference of potential (comprised between a few millivolts and about one volt) is observed, due mainly to the polarization of the electrodes 1 and 2, it is an advantage to compensate this by means of an equal and opposite electro-motive force in the same way as in the known methods of electric prospection of non-frozen ground. This potential is produced in a potentiometer comprising a dry battery 23, which delivers into a resistance 24 having one fixed connection 25 coupled to the electrode 1 through the conductor 26, while the moving contact or slider 27 is connected through the conductor 28 to the casing 9 of the electrometer.

It has been found that only the screen of the conductor 12 is essential, the terminals 10, 21 and 25—27, and also the base-plate 11 requiring only very moderate insulation.

Figure 2:
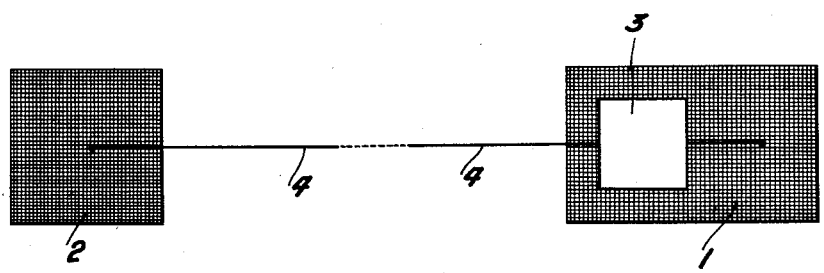
FIG. 2 is a simplified plan view of the same device, it being supposed that the two electrodes are actually located under a perfectly transparent layer of ice.

The method of operation of the device of FIGS. 1 and 2 placed on ground which is frozen or covered with ice is the same as that of known apparatus for electric prospection, comprising measuring electrodes and working on a ground which is not frozen or covered with ice, and this is also true in respect of the setting of the potentiometer for the compensation of the polarisation of the electrodes, and the calibration (by injecting into the circuit a given electro-motive force by action on the slider 27 of the potentiometer) and also the measuring operations proper. Thus it has been found for example that on the Aletsch Glacier, the difference in potential between two points was subject to incessant natural fluctuations (visible on the photographic recording made on the sensitive paper 17) in the same way as the difference of potential between two points of a non-frozen ground (the known fluctuations of this latter difference of potential being generally known as telluric fluctuations).

With the device of FIGS. 1 and 2, it is also possible to carry out measurements when electric currents are voluntarily injected in the vicinity of the device. The injection may be effected for example by means of the apparatus shown in plan view in FIG. 3, the combination of FIGS. 2 and 3 showing the arrangement on the ground of the injection apparatus and the measuring device.

The injection apparatus (see FIG. 3) comprises essentially two electrodes 29 and 30 of the same type as the electrode 2, that is to say of wire-netting or metal lattice, coupled by an insulated conducting cable 31, the insulation of this cable not being required to be carried out with any great care. In the line of injection 31, there is interposed on the one hand a source of current 35 of low output (for example a dry battery), since it is only required to deliver very small currents by reason of the high resistance of the frozen ground or the ice, and on the other hand, a switch 32. The injection apparatus preferably comprises in addition, means for measuring the intensity of the current injected into the frozen ground or the ice when the switch 32 is closed; these means may comprise for example a resistance 33 arranged in series in the injection circuit, and an electrometer 34, similar to the electrometer 7, and connected to a galvanometer (not shown).

Figure 3:
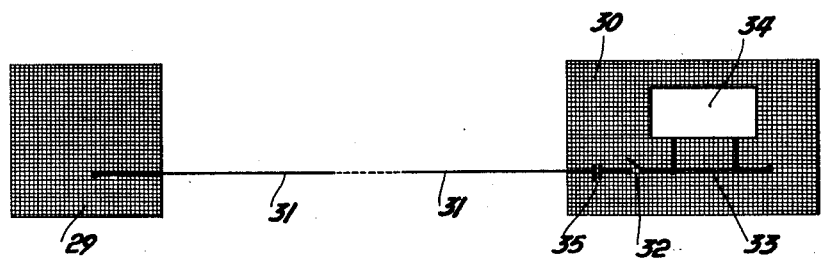
FIG. 3 is a view similar to that of FIG. 2, showing the current-injection apparatus, the combination of FIGS. 2 and 3 constituting a plan view of an apparatus with four electrodes, of which two are employed to inject a current into the ground, and the other two measure a difference of telluric potential.

During tests made, also on the Aletsch Glacier, with the circuit of FIGS. 2 and 3, it was found that during the closure of the switch 32 of the injection apparatus, the galvanometer 15 of the measuring device was abruptly deflected by an amount which enabled the difference in potential produced between the electrodes 1 and 2 by the circulation through the ice of the current injected by the electrodes 29 and 30 to be determined. It was observed that the differences in potential thus artificially created in the ice are not extremely small as might be thought, since, by reason of the extremely high resistivity of the medium (ice, frozen ground), the current density, which is inversely proportional to the resistivity, is very small, the potential gradients which are proportional at the same time to the resistivity and to the current density are scarcely modified, and it is thus possible to make very convenient measurements with the device in accordance with the invention, and this with a very small injected current which in consequence required only a dry battery 35 of small output and a conductor 31 of very small section.

As indicated above, the device of FIGS. 1 and 2, completed by the apparatus of FIG. 3, permits of carrying out on ground which is frozen or covered with ice, all the measurements or determinations which can be made with known apparatus on normal types of ground.

It is clear that any person skilled in the art will find no difficulty in varying in many ways the devices described above, without thereby departing from the scope of the invention or varying its spirit. In particular, while for reasons of simplicity the working platform has been provided just above one of the electrodes, while the floor is electrically connected to this electrode, it is quite clear that a floor separate from the electrodes may be adopted, this floor not being connected to either the one or the other and placed in any position whatever, on condition that the electrometer is coupled to the electrodes through two coaxial cables instead of one only.

What I claim is:

1. A device for electrical prospection of ground having an extremely high resistivity, in particular of ground which is frozen or covered with ice, said device comprising: a first electrode buried in the ground; a substantially conductive second electrode spaced apart horizontally from said first electrode and also buried in the ground; a working platform placed on the ground and electrically connected to said second electrode; an electrical apparatus placed on said platform, said apparatus including an electrometer receiver having a sensitive member, a casing and an output, and electrically-insulated from said platform; and a coaxial cable having an axial conductor and a conductive outer braid, said axial conductor connecting said first electrode to the sensitive member of said receiver; means for electrostatically screening said conductor by coupling the portion of said conductive braid in the vicinity of the receiver to the casing of said receiver, and means for compensating the polarization potentials produced between said first and second electrodes, said means including a source of electrical power, and a potentiometer resistance in parallel with said source, the slider of said potentiometer being connected to the receiver casing and the other terminal of said potentiometer being connected to said second electrode.

2. A device as set forth in claim 1, in which the said first and second electrodes are constituted by metallic wire-netting of large mesh.

3. A device as set forth in claim 1, in which the said platform and second electrode are formed by a single member constituted by a strip of metallic wire-netting of large mesh folded in the form of a U, one of the limbs of this U being buried in the medium to be prospected while the other limb rests on the surface of the said medium.

4. A device as set forth in claim 1 in which the said receiver is constituted by an electrometer tube, the sensitive member of which is the control grid, and further comprising an amplifier following the said receiver.

5. A device as set forth in claim 1, in which the output of the said receiver is applied to an indicating device.

6. A device as set forth in claim 1, in which the output of the said receiver is applied to an indicating device, said indicating device is a sensitive galvanometer.

7. A device as set forth in claim 1, in which the output of the said receiver is applied to an indicating device, said indicating device being a sensitive galvanometer, and further comprising a device for photographically-recording the indications of the said galvanometer.

8. A device as set forth in claim 1, in which the said working platform is separate and distinct from either of said first and second electrodes, and is electrically unconnected therewith, and further comprising two coaxial cables for separately connecting the said electrometer to the two said electrodes.

9. A device as set forth in claim 1, in which the said indicating device is a sensitive galvanometer and further comprising at least one rheostat mounted between the output of the receiver and the input of the said indicating device.

10. A device according to claim 1, and further comprising current injection apparatus including two electrodes of metallic wire-netting buried in said medium and connected together by a series circuit comprising an insulated conductor, a source of direct current, and a switch.

11. A system as claimed in claim 10, in which the said series circuit further comprises a resistance and a measuring electrometer device connected in parallel with said resistance.

12. An electrostatic prospection system for measuring a difference of natural or injected potentials between two electrodes placed in a practically insulating dielectric medium such as ice or frozen ground to determine the thickness of said medium and the electrical resistivity of the underlying non-frozen ground, comprising two electrodes in said medium, measuring and recording apparatus, conductors connecting said electrodes and said apparatus, a conducting platform connected to one of said electrodes and screening members connected to said conducting platform and electrostatically protecting said measuring and recording apparatus and said conductors, the system further comprising a second pair of electrodes inserted in the ice or frozen ground and direct current means connected to said second pair of electrodes for applying direct current thereto.

References Cited in the file of this patent

UNITED STATES PATENTS

| | | |
|---|---|---|
| 1,803,405 | Ricker | May 5, 1931 |
| 2,240,520 | Schlumberger | May 6, 1941 |
| 2,250,024 | Jakosky | July 22, 1941 |
| 2,284,990 | Schlumberger | June 2, 1942 |
| 2,368,218 | Hayes | Jan. 30, 1945 |
| 2,586,667 | Kunetz | Feb. 19, 1952 |
| 2,802,174 | Staunton | Aug. 6, 1957 |
| 2,895,052 | Weisglass et al. | July 14, 1959 |
| 2,901,687 | Barret | Aug. 25, 1959 |

OTHER REFERENCES

Text: "Exploration Geophysics," by J. J. Jakosky, Trija Publishing Co. (Los Angeles), 1950; pages 533 and 534 relied on.

Cook: Geophysics, volume 21, 1956; pages 1055–1070, "An Electrical Crevasse Detector."